3,035,981
PROCESS FOR EXTRACTING VITAMIN A FROM SOURCE OILS

Frank J. Sevigne, Tarrytown, N.Y., assignor to Collett-Week Corporation, Ossining, N.Y., a corporation of New York
No Drawing. Filed Oct. 20, 1958, Ser. No. 768,027
3 Claims. (Cl. 167—81)

This invention relates to the preparation of vitamin A concentrates from various natural sources and in particular it is concerned with the production of vitamin A concentrates from such sources as liver oils.

The basic problem in the preparation of vitamin A concentrate from natural sources involves separation of the vitamin A and similar closely related compounds in concentrated form from the medium in which they occur. Since fish liver oils are notoriously rather unpalatable, the sharper the separation of the vitamin extract from the flavor imparting portion of the oil, the more advantageous the process. Separations which can be made sharp enough to give high potency concentrates are correspondingly of real commercial value.

Accordingly, this process is concerned with an improvement in the separation of vitamin A concentrates from such sources as fish liver oils, in which the vitamin A and related unsaponifiable products are separated from the oil medium by saponification of a portion of the oil, hydrocarbon extraction, and then subsequent extraction of the unsaponifiable portion with alcohol in a winterizing operation, whereupon, remaining concentrate reduced to a high vitamin A potency is again extracted with alcohol and then with acetonitrile to give the high potency product.

The process, accordingly, is concerned with the steps and combinations of steps involved in the operation of caryring out the vitamin A concentration to separate a high potency, commercially useful fraction, and utilizing acetonitrile as a final extracting medium.

Sources of vitamin A commonly will be such materials as, whale liver oil, pollack liver oil, halibut liver oil, shark liver oil, cod liver oil, and, in general, any of the fish which are caught in sufficiently large commercial quantities and also show a significant vitamin A content in their livers.

In the oil, the natural concentration of vitamin A is variable.

In the preparation of vitamin A concentrates the oil is subjected to a saponification reaction, for example, with alcoholic potassium hyydroxide. The only function of this operation is to remove the fatty acids and to saponify glycerides which are present in the mixture as it occurs. Functionally, the quantity of the solvent for alkali used is merely that minimum which is sufficient to carry out the operation needed. Subsequent to the saponification, the soap solution is diluted with water and extracted with a low boiling hydrocarbon, for example, hexane, or petroleum ether, whereupon the unsaponifiable matter passes into the hydrocarbon or extractant phase. When the separation of phases, aqueous or alcoholic from hydrocarbon, is completed, the hydrocarbon solvent is evaporated to leave a residue, usually in the form of an oil, yellowish, to a dark reddish brown, of the vitamin A and related compounds.

In processes carried out in accordance with the prior art, this unsaponifiable fraction has been extracted with methanol or ethanol repeatedly to produce a concentrate in which the vitamin A appears. This is merely based upon the fact that vitamin A is more soluble in the alcohol and a partition of the vitamin A together with its accompanying compounds occurs between the alcohol and the accompanying compounds.

It is with the extraction of the unsaponifiable portion of a source oil that my invention is particularly concerned, because, in preference to extracting the unsaponifiable portion with methanol or similar solvent repeatedly, my process is characterized by the extraction of the unsaponifiable fraction with acetonitrile, or first with methanol and subsequently with acetonitrile. Thus, the process consists of the preparation of the unsaponifiable fraction of liver oil, or other oil source of vitamin A, preferably a winterized unsaponifiable fraction, which is characterized by its having had cholesterol and other sterols removed by freezing, whereupon the fraction to be extracted consists normally of 25 percent or more natural isomers of vitamin A, together with other unsaponifiable constituents of vitamin A bearing oils.

The practice of the process will be understood more fully by reference to the following detailed example:

EXAMPLE I

Using an unsaponifiable fraction prepared from a fish liver oil a single volume of the unsaponifiable fraction was carefully mixed with about 3-4 times its volume of 90 percent methanol. After careful agitation together, the phases were separated, and the methanol evaporated to yield a vitamin A concentrate. The unsaponifiable fraction was extracted a second time with an equal volume of acetonitrile and the acetonitrile then evaporated to produce further fraction of vitamin A concentrate.

The alcohol fractions and the acetonitrile fractions were assayed and it was found in a sequence of applications to several specific oils and several mixtures of oils (designated "fish oil" in the table) that results as summarized in the following table were consistently obtained.

Table I.—Vitamin A Concentration of Acetonitrile Extraction

| Previous Treatment, 3 or 4 volumes:1 alcohol to unsaponifiable | Pollock Liver Oil— 1 Extraction with 100 percent Methanol | Fish Liver Oil— 1 Extraction with 90 percent Methanol | Mexican Shark Liver— 1 Extraction with 100 percent Methanol | Fish Liver Oil— 2nd to 4th Extraction with 90 percent Methanol | 53 percent Pollock 47 percent Fish Liver Oil— 1 Extraction with 100 percent MeOH 6-8th 90 percent MeOH Extractions | Mexican Shark Liver— 1 Extraction with 100 percent MeOH | Mexican Shark Liver— 1 Extraction with 100 percent MeOH | Mexican Shark Liver— 1 Extraction with 100 percent MeOH; 1 Extraction with 90 percent | Soupfin Livers—Dried Unsaponifiable | |
|---|---|---|---|---|---|---|---|---|---|---|
| Original | 440,800 | 1,236,900 | 1,248,300 | 1,331,900 | 800,000 / 1,000,000 | 1,168,000 | 1,086,800 | 1,060,000 | 1,390,000 | |
| Acetonitrile Fraction | 1,043,100 | 1,689,100 | 2,143,200 | 1,846,900 | 1,518,100 | 2,099,500 | 2,017,800 | 1,858,200 | 2,137,500 (a) | 2,084,300 (b) |
| Percent of total units removed | 77.2 | 47.3 | 61.7 | 63.5 | 44.7 | 61.6 | 59.0 | 63.3 | 57 | 19.9 |
| Dark Oil Fraction | 111,910 | 959,500 | 723,900 | 862,600 | 634,600 | 640,300 | 619,400 | 604,200 | | 720,100 |
| Percent | 16.3 | 49.6 | 36.3 | 34.6 | 52.7 | 35.0 | 38.1 | 36.5 | | 17.9 |
| Yield | 93.5 | 96.9 | 98.0 | 98.1 | 97.4 | 96.6 | 97.1 | 99.8 | | 94.4 |
| (A) Unsap. Wgt | 9.950 | 36.352 | 23.417 | 39.260 | 92.911 | 65.490 | 73.884 | 52.569 | 82.500 | 52.000 |
| (B) Acetonitrile | | | 130.0 | 272.5 | 300.0 | 335.0 | 323.5 | 267 | 337 | 167.5 |
| Ratio A:B | | | 1:5.6 | 1:7.0 | 1:3.2 | 1:5.1 | 1:4.4 | 1:5.1 | 1:4.1 | 1:3.2 |

The significance of the data will be apparent by an inspection of the columns where it appears, consistently, in each of the operations the acetonitrile fraction shows a substantially higher concentration of vitamin A than that obtained with methanol or ethanol. Similarly, the dark oil fraction which is found at the interface between the extraction and that which is being extracted, is materially enriched.

Singularly, the effect of the acetonitrile in concentrating vitamin A is apparent from the data, because the data indicate that the acetonitrile is at least about 50 percent more effective than methanol and this when the acetonitrile is used on a fraction after one extraction with methanol. Accordingly, in accordance with the process the unsaponifiable fraction obtained from any of the fish liver oils may first be subjected to a methanol or ethanol extraction followed by acetonitrile extraction to the limit of economic utility, or it is extracted solely with the acetonitrile, again repeatedly, to the limit of economic utility. Methanol and ethanol are preferred alcohols for use, but propyl and isopropyl may also be used. Heavier alcohols are not desirable because they must be removed and their lower volatilities make the process too difficult.

EXAMPLE II

In a further variant of the process vitamin A concentrate in unsaponifiable fraction was winterized to separate cholesterol present in the medium, whereupon the concentrate was then subjected to extraction with acetonitrile. In general, it will be found that the concentrate subjected to a sequence of two, three or four extractions will give a high potency vitamin A extract as illustrated by the following table, in which the results are tabulated:

*Table II.—Extraction of Winterized Concentrate With Acetonitrile*

[Volume ratio, 4 acetonitrile/1 unsaponifiable]
SAMPLE: PLANT WINTERIZED, POLLOCK OIL, 589,000 U.S.P. A./GM.

| No. of Extractions | 1st | 2nd | 3rd | 4th |
| --- | --- | --- | --- | --- |
| Percent weight Extraction | 17.8 | 14.6 | 9.0 | 7.1 |
| Percent Units Extraction | 41.34 | 42.3 | 41.6 | 40.0 |
| Potency U.S.P., Units per gram | 1,409,000 | 1,221,000 | 1,240,000 | 1,057,000 |
| Cumulative Total of Weight Extraction | 17.8 | 29.8 | 36.1 | 40.6 |
| Cumulative Total of Units Extracted | 41.3 | 66.1 | 80.1 | 88.0 |
| Percent of U.S.P. Units in Residue | 58.6 | 33.8 | 19.9 | 12 |

| Residue | |
| --- | --- |
| Based on weight | 59.4 |
| Based on U.S.P. Units | { 12 / 107,700 } |

In summary, therefore, the process for the extraction of the unsaponifiable portion of the source oil consists in the steps of heating the fraction being extracted with acetonitrile to a refluxing temperature, which is about 80° C., but need be only sufficient to put all the material in solution.

The volumes used are not critical, but, in general, it will be found that at least sufficient nitrile should be used to give a volume which is easy to handle. In general, this will be about equal to the volume of the unsaponifiable fraction. The material is then cooled to room temperature. The sterols separate slowly in the process of cooling and are removed when the material has stood at room temperature. This leaves behind a solution of the vitamin A oil in acetonitrile. This solution is then cooled to about −10° C., removing at the same time last portions of the sterol content and also forming a dark oil second phase. At this stage of the operation, acetonitrile contains the vitamin A and its closely related compounds in solution. They are recovered from the acetonitrile by distilling to remove the acetonitrile. In general, the volume of the acetonitrile found practical for use in the extraction to get a good separation of phases is about 3 to 7 volumes of the acetonitrile to 1 volume of the unsaponifiable matter.

What is claimed is:

1. In a process for the preparation of vitamin A concentrates from natural fish sources which are characterized by the occurrence of vitamin A in an oil, wherein the steps comprise fundamentally separating an unsaponifiable fraction of said oil in solution from the oil and concentrating said fraction, the improvement which comprises, extracting said concentrated unsaponifiable fraction serially first with solvent alcohol and then acetonitrile to obtain the vitamin A concentrate.

2. The process in accordance with claim 1 in which the unsaponifiable fraction consisting of the vitamin A concentrate is subjected to first extraction with methanol, and thereafter is finally extracted with acetonitrile, using volumes of extractant about equal to the volume of the fraction being extracted in each stage of the extraction.

3. The process in accordance with claim 1 in which the unsaponifiable fraction consisting of the vitamin A concentrate is subjected to first extraction with ethanol and thereafter is finally extracted with acetonitrile using volumes of extractant about equal to the volume of the fraction being extracted in each stage of the extraction.

References Cited in the file of this patent

UNITED STATES PATENTS

| 2,412,766 | Buxton | Dec. 17, 1946 |
| --- | --- | --- |
| 2,573,897 | Freeman | Nov. 6, 1951 |
| 2,676,903 | Scheibel | Apr. 27, 1954 |

Dedication 3,035,981.—*Frank J. Sevigne*, Tarrytown, N.Y. PROCESS FOR EXTRACTING VITAMIN A FROM SOURCE OILS. Patent dated May 22, 1962. Dedication filed May 20, 1976, by the assignee, *General Mills, Inc.*

Hereby dedicates to the Public the remaining term of said patent.

[*Official Gazette July 27, 1976.*]